United States Patent
Imamura et al.

(10) Patent No.: US 8,140,227 B2
(45) Date of Patent: Mar. 20, 2012

(54) VEHICLE AIRBAG DEVICE AND CONTROL METHOD THEREOF

(75) Inventors: Kenji Imamura, Kosai (JP); Etsuo Shimizu, Toyota (JP); Shigeru Washino, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 441 days.

(21) Appl. No.: 12/522,719

(22) PCT Filed: Jan. 15, 2008

(86) PCT No.: PCT/IB2008/000077
§ 371 (c)(1), (2), (4) Date: Jul. 10, 2009

(87) PCT Pub. No.: WO2008/087523
PCT Pub. Date: Jul. 21, 2008

(65) Prior Publication Data
US 2010/0004827 A1  Jan. 7, 2010

(30) Foreign Application Priority Data
Jan. 16, 2007   (JP) ................................ 2007-006610

(51) Int. Cl.
*G06F 19/00* (2006.01)
(52) U.S. Cl. ................ 701/45; 701/41; 701/48; 701/49; 280/731
(58) Field of Classification Search .................... 701/45, 701/41, 48, 49, 36; 280/731, 732, 728.1, 280/728.2
See application file for complete search history.

(56) References Cited

U.S. PATENT DOCUMENTS

| | | | |
|---|---|---|---|
| 7,364,345 B2 * | 4/2008 | Fang | 362/634 |
| 7,441,799 B2 * | 10/2008 | Enders et al. | 280/731 |
| 7,651,124 B2 * | 1/2010 | Gulde | 280/731 |
| 2005/0121889 A1 | 6/2005 | Enders et al. | |

FOREIGN PATENT DOCUMENTS

| | | |
|---|---|---|
| EP | 0 551 732 | 7/1993 |
| EP | 1 714 840 | 10/2006 |
| JP | 11 170958 | 6/1999 |
| JP | 11-170959 | 6/1999 |
| JP | 11 342819 | 12/1999 |
| JP | 2001-151072 | 6/2001 |
| JP | 2007 62471 | 3/2007 |

OTHER PUBLICATIONS

Office Action issued Oct. 21, 2008, in Japan Patent Application No. 2007-006610 (with English-language Translation).

* cited by examiner

*Primary Examiner* — Richard M. Camby
(74) *Attorney, Agent, or Firm* — Oblon, Spivak, McClelland, Maier & Neustadt, L.L.P.

(57) ABSTRACT

A vehicle airbag device provided in a steering apparatus, wherein the steering apparatus is configured with grips positioned on the right and left sides but are not positioned on an upper side. An airbag, installed at the center of the steering apparatus, is configured to deploy toward the driver when a vehicle collision occurs. An electronic control unit controls an inflation pressure of the airbag to be increased when the steering angle detected by a steering angle sensor is less than or equal to a predetermined reference angle, as compared to when the steering angle detected by the steering angle sensor exceeds the predetermined reference angle.

10 Claims, 7 Drawing Sheets

FIG. 8C ary that is executed by an electronic control unit
VEHICLE AIRBAG DEVICE AND CONTROL METHOD THEREOF

BACKGROUND OF THE INVENTION

1. Field of the Invention

The present invention relates to a vehicle airbag device and a control method thereof, more particularly, to a vehicle airbag device provided in a steering apparatus that is configured so that grips for steering are not positioned on an upper side thereof.

2. Description of the Related Art

Japanese Patent Laid-open Publication No. H11-342819 describes a steering apparatus comprising a non-circular steering wheel in which the wheel grips are provided on the left and right sides of the steering wheel. In the steering apparatus described in Japanese Patent Laid-open Publication No. H11-352819, an airbag is accommodated in the center portion of the steering wheel. When a vehicle collision occurs, the airbag is deployed while a pad cover covering the airbag is upwardly and downwardly divided and is opened. The divided and opened pad cover supports the rear side of the deployed airbag. Therefore, even though a non-circular steering wheel is used, the opened pad cover accurately prevents the deployed airbag from displacing in the vehicle forward side.

However, if a vehicle occupant comes into contact with the pad cover during a vehicle collision, the rigidity of the pad cover may be such that the pad cover maintains its position against the impact of the occupant.

SUMMARY OF THE INVENTION

The present invention provides a vehicle airbag device provided in a steering apparatus that is configured with wheel grips positioned on the left and right sides of the steering wheel, but not on the upper side of the steering apparatus. The apparatus is rotated to steer the vehicle. The vehicle airbag device of the present invention is characterized in that the deploying airbag exerts a suitable reaction force to appropriately protect the vehicle occupant because a pad cover made of a high rigidity material is not used, as in the conventional airbag device.

In a first aspect, the present invention provides a vehicle airbag device provided in a steering apparatus. The steering apparatus is configured with the grips positioned on the right and left sides of the steering apparatus, but not on the upper side of the steering apparatus. The vehicle airbag device includes an airbag that is accommodated in the center portion of the steering apparatus and that deploys toward the driver; a steering angle sensor that detects the steering angle of the steering apparatus; and a deployment control unit that controls the deployment of the airbag when a vehicle collision occurs or when the vehicle collision is predicted, wherein the deployment control increases the inflation pressure of the airbag when the detected steering angle is less than or equal to a predetermined reference angle. In this instance, the reference angle may be a value which is less than 90° in a right-hand side or a left-hand side from the neutral position. For example, the reference angle may be a value 45° or 60° in the right-hand side or the left-hand side from the neutral position.

In accordance with the first aspect of the present invention, when the steering apparatus is rotated toward the right-hand side or a left-hand side from the neutral position, so that the grips are positioned on an upper side of the steering apparatus, in this position, the grips support the rear side of the airbag and prevent displacement of the middle upper portion of the airbag toward the front of the vehicle. In addition, the grips cannot prevent the displacement of the middle upper portion of the airbag in the forward direction the vehicle. However, in this instance, when the airbag deploys, the inflation pressure of the airbag is controlled to become higher than that of a case in which the steering apparatus is in the neutral position. Therefore, because the airbag is inflated using a higher inflation pressure, the middle upper portion of the airbag is prevented from being displaced in the forward direction of the vehicle. Accordingly, the displacement of the middle upper and lower portions of the airbag in the forward direction of the vehicle regardless of the position of the steering apparatus. The reaction force exerted by the airbag 31 properly restrains the driver's head, and the driver's head is thereby prevented from being displaced in the forward direction of the vehicle. As a result, the driver is well protected.

In a second aspect, the vehicle airbag device further includes an actuator that rotates the steering apparatus and a rotation control unit that controls the actuator. The rotation control unit controls the actuator so that the steering apparatus is rotated to the neutral position when the detected steering angle is less than or equal to the predetermined reference angle. Furthermore, the rotation control unit controls the actuator so that the steering apparatus is rotated to a position 90° from the neutral position when the detected steering angle is greater than the predetermined reference angle.

In accordance with the second aspect of the present invention, when the steering apparatus is not in the neutral position or 90° from the neutral position, the rotation control unit controls the actuator to rotate the steering apparatus to the neutral position or a position of 90° from the neutral position. The inflation pressure is switched between a high inflation pressure and a low inflation pressure depending on the mode in which the inflation controller is operating in. Then the mid-upper portion of the airbag is constantly prevented from being displaced in the forward direction of the vehicle. As a result, the driver's head is safely protected because the reaction force exerted by the airbag properly restrains the driver's head, and the driver's head is thereby prevented from being displaced in the forward direction of the vehicle.

In a third aspect, the present invention provides a method of controlling the deployment of an airbag device provided in a steering apparatus. The steering wheel is configured so that the grips are positioned on both the right and left side, but not on the upper side of the steering apparatus. The control method comprises detecting the steering angle of the steering apparatus. If a vehicle collision occurs or is predicted, the inflation pressure of the airbag is increased if the detected steering angle is less than or equal to a predetermined reference angle.

BRIEF DESCRIPTION OF THE DRAWINGS

The above and other features and advantages of the present invention will become apparent from the following description of example embodiments, given in conjunction with the accompanying drawings, in which.

DETAILED DESCRIPTION OF THE PREFERRED EMBODIMENTS

Various embodiments of the present invention will now be described in detail with reference to the accompanying drawings.

Figure 1:
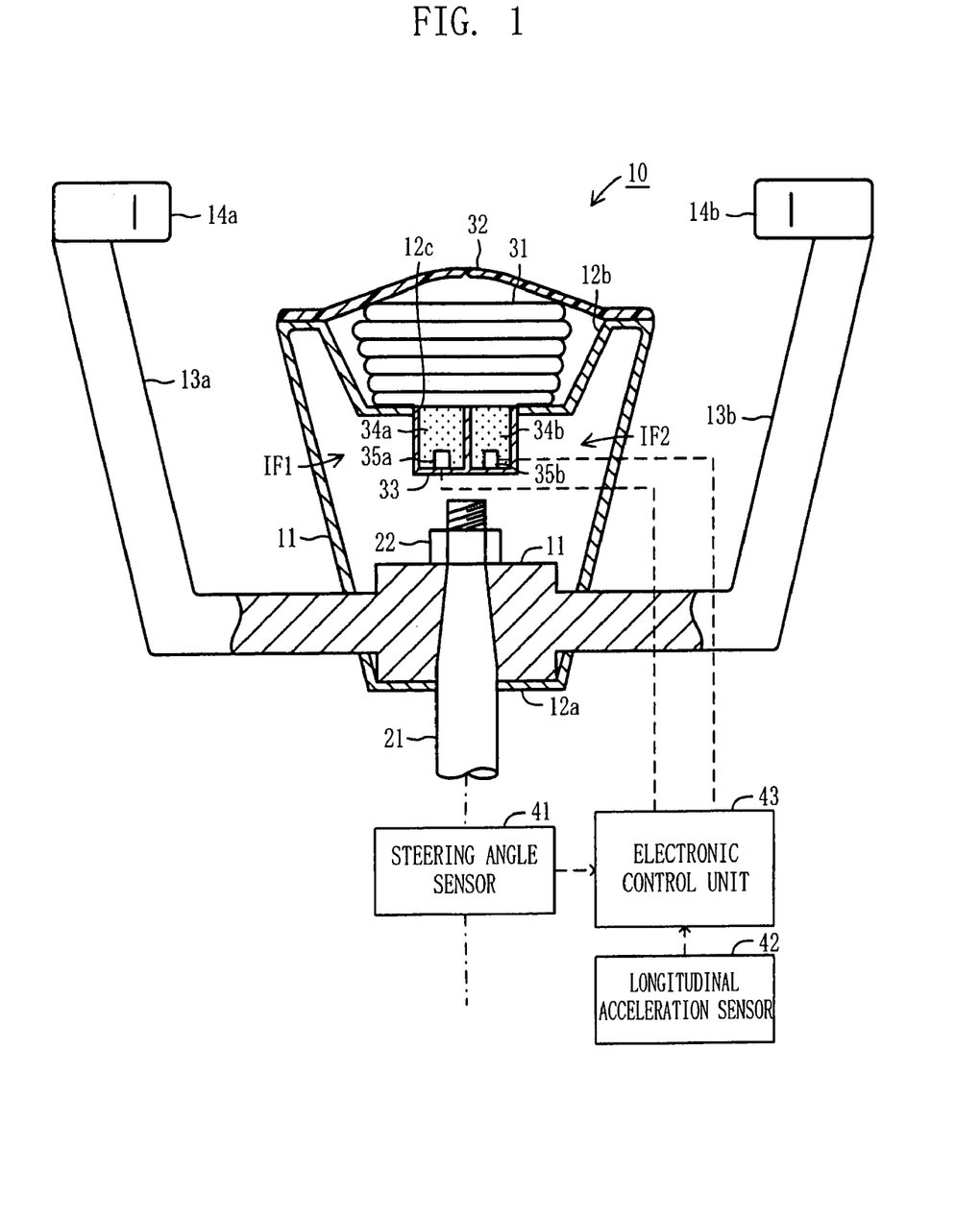
FIG. 1 is a vertical cross-sectional and a top view illustrating a vehicle steering apparatus including an airbag in accordance with a first embodiment of the present invention.
Figure 2:
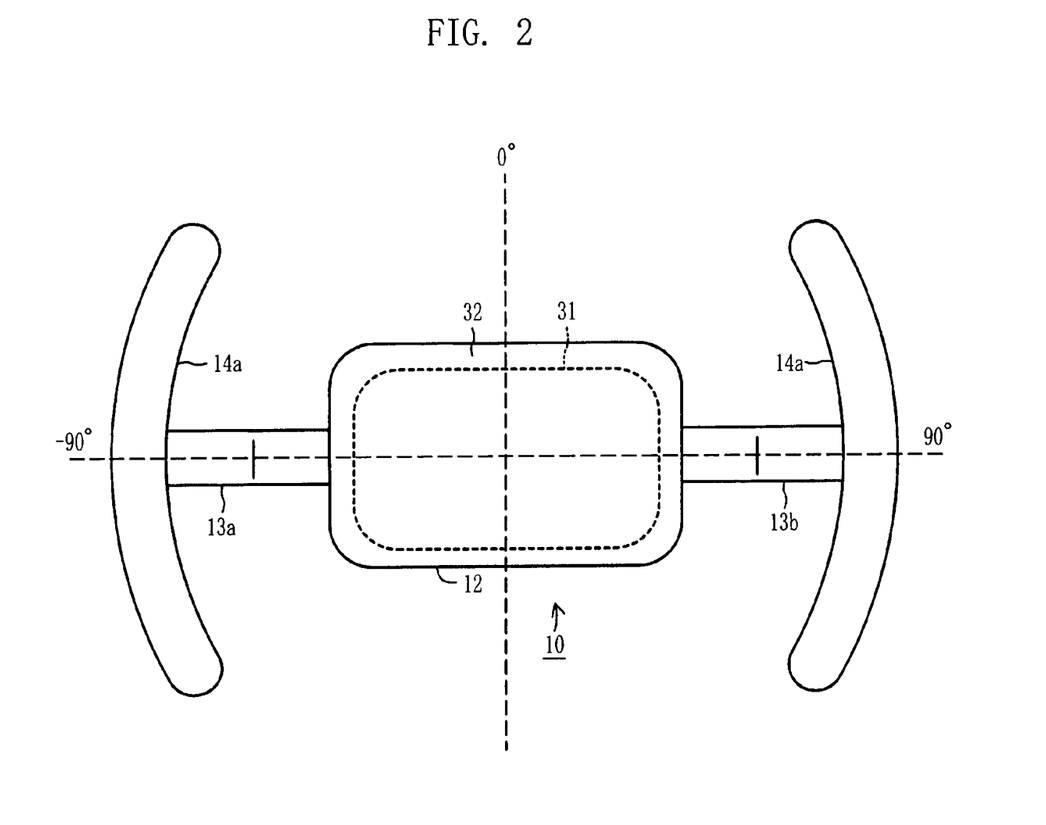
FIG. 2 is a plan view illustrating the vehicle steering apparatus shown in FIG. 1.

Hereinafter, a first embodiment of the present invention will be described in detail with reference to the drawings. FIG. 1 is a vertical cross-sectional and a plan view illustrating a vehicle steering apparatus that includes an airbag in accordance with a first embodiment of the present invention, in which an electronic control apparatus is added. FIG. 2 is a front view illustrating the vehicle steering apparatus shown in FIG. 1.

The vehicle steering apparatus includes a steering apparatus 10. The steering apparatus 10 includes a hub 11 that is accommodated within a housing 12. The hub 11 is fixed to the upper end of a steering shaft 21 by means of a nut 22 and rotates integrally with the steering shaft 21. The lower portion of the steering shaft 21 is mechanically connected to the right and left front wheels through a steering mechanism (not shown in drawings). Therefore, the right and left front wheels are steered by rotating the steering apparatus.

The left and right sides of the hub 11 are integrally connected to a pair of spokes 13a and 13b that extend through the housing 12. The middle portion of each spoke 13a and 13b is obliquely and upwardly bent. Grips 14a and 14b are provided at the upper end of each spoke 13a and 13b, respectively, to be held by driver. The grips 14a and 14b are configured to a column member formed into an arcuate shape. The lower surface in a longitudinal middle portion of the grips 14a and 14b are integrally connected to the upper ends of the spokes 14a and 14b. Accordingly, when the driver holds the grips 14a and 14b and rotates the steering apparatus 10, the steering shaft 21 is rotated about its axis, and thus allows the right and left front wheels to be steered. In the present embodiment, the grips 14a and 14b are rotatable within a 135° range to the right and left of the neutral position of the steering apparatus by means of a mechanism (not shown in drawings). Although the rotational range of the grips 14a and 14b is small, if a mechanism for varying a steering gear ratio (VGRS mechanism) is applied, the right and left front wheels can be steered with a sufficiently large steering angle. The small rotational range of the steering apparatus 10 do not require the driver to change his or her grip of the steering apparatus 10. In addition, the space separating the non-circular grips improves the visibility of the instrument cluster.

The housing 12 is formed into a truncated cone shape having a large diameter at its upper portion. The bottom surface 12a of the housing 12 is fixed to the hub 11. A concave portion 12b is formed on the upper surface of the housing 12, and the airbag 31 is accommodated in the concave portion 12b in a folded state. The upper surface of the concave portion 12b is covered by a pad cover 32 made of resin. A slit is formed on a predetermined position of the pad cover 32. The pad cover 32 is broken when the airbag is deployed.

The housing 12 is provided at the mid-lower portion of the concave portion 12b with a through hole 12c. A container 33 is fixed at the through hole 12c so that the container 33 is communicated with a gas injection port of the airbag 31 at its upper end. The container 33 is divided into two chambers by means of a partition. Each of two chambers is communicated with the airbag 31. Gas generating agents 34a and 34b are contained in the two chambers respectively, and squibs 35a and 35b are disposed in the chambers respectively. The first inflator IF1 is configured of the container 33, the gas generating agent 34a and the squib 35a. The second inflator IF2 is configured of the container 33, the gas generating agent 34b and the squib 35b.

Next, the electronic control apparatus controlling the first and second inflators IF1 and IF2 will be described below. The electronic control apparatus includes a steering angle sensor 41, a longitudinal acceleration sensor 42, and an electronic control unit 43.

The steering angle sensor 41 is installed to the steering shaft 21 and detects a rotation angle of the steering shaft 21 about its axis so as to detect a steering angle θ of the steering apparatus 10. The steering angle θ represents the neutral position of the steering apparatus 10 as "0°", a rotation angle toward the left side of the steering apparatus 10 as negative, and a rotation angle toward the right side of the steering apparatus 10 as positive, respectively. The longitudinal acceleration sensor 42 is installed in the vehicle and detects the longitudinal acceleration G acting on the vehicle. The longitudinal acceleration G represents a forward acceleration of the vehicle as positive, and represents a backward acceleration of the vehicle as negative. Therefore, in the present invention, the longitudinal acceleration G is a large negative value when a vehicle collision occurs. The electronic control unit 43 is configured as a micro-computer including CPU, ROM, RAM, timer, etc. and controls the first and the second inflators IF1 and IF2 by repeatedly performing an airbag deployment control program in FIG. 3 at predetermined intervals.

The operation of the vehicle steering apparatus will be described below. While the vehicle is moving, if the driver holds the grips 14a and 14b and maintains the steering apparatus in the neutral position, the right and left front wheels are also maintained in the neutral position, keeping the vehicle going straight ahead. In addition, when the driver rotates the steering apparatus 10 to the right or left, the rotation of the steering apparatus 10 is transmitted to the steering shaft 21, and thus the left and right front wheels are steered to the right or left, to thereby allow the vehicle to turn right or left.

Figure 3:
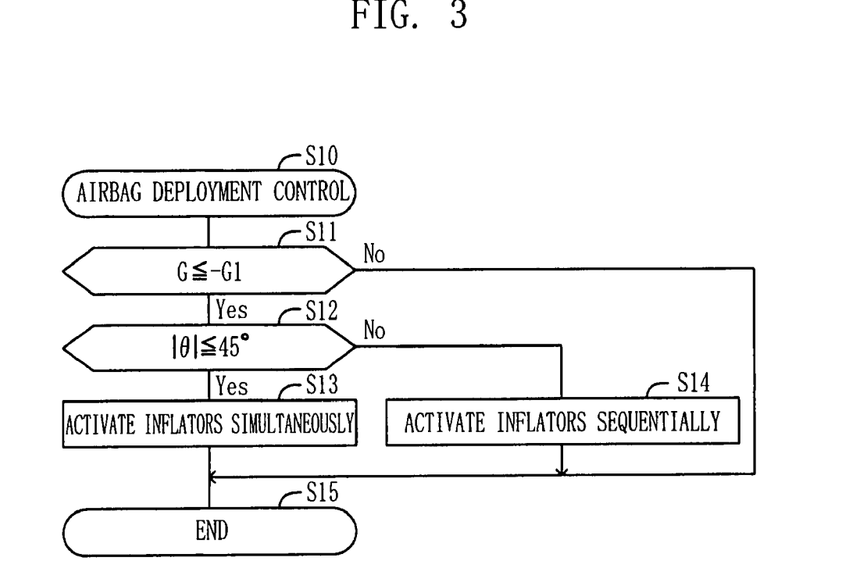
FIG. 3 is a flow chart illustrating an airbag deployment control program that is executed by an electronic control unit shown in FIG. 1 and FIG. 6.

In addition, while the vehicle is moving in the manner described above, the electronic control unit 43 repeatedly executes the airbag deployment control program including steps S10-S15 illustrated in FIG. 3 at predetermined intervals. In the airbag deployment control program, at step S11 (hereinafter, the technical term "step" is omitted from the step numbers), the longitudinal acceleration G is input from the longitudinal acceleration sensor 42. Then, the electronic control unit 43 determines whether longitudinal acceleration G is less than or equal to a predetermined negative acceleration −G1. The predetermined value −G1 is preset to a value that represents a negative acceleration that has a very large absolute value, i.e., a very large deceleration, as in the case that where the vehicle collides with an object in front of the host vehicle (hereinafter, referred to a front object). Therefore, at a determination process at S11, it is determined whether the vehicle collides with the front object. When the longitudinal acceleration G does not exceed the predetermined value −G1, the electronic control unit 43 determines "No" at S11, and then an execution of the airbag deployment control program is terminated at S15.

In addition, if the vehicle collides with the front object and the longitudinal acceleration G is less than or equal to the predetermined value −G1, the electronic control unit 43 determines "Yes" at S11. At S12, the electronic control unit 43 inputs the steering angle θ from the steering angle sensor 41, and determines whether an absolute value of the steering angle |θ| is less than or equal to a reference steering angle (i.e., 45°). If the absolute value of the steering angle |θ| is less than or equal to 45°, the electronic control unit 43 determines "Yes" at S12, and operates the first and the second inflators IF1 and IF2 simultaneously. The squibs 35a and 35b are energized at the same time.

Figure 4:
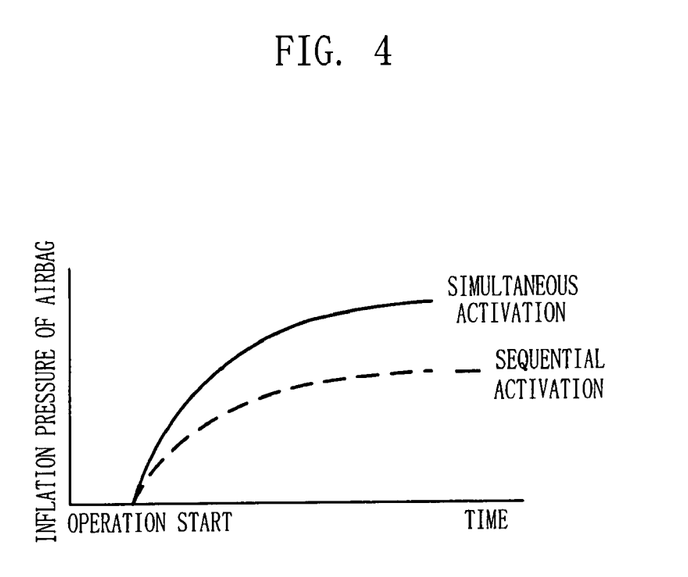
FIG. 4 is a graph illustrating a change characteristic of an inflation pressure of the airbag.
Figure 5A:
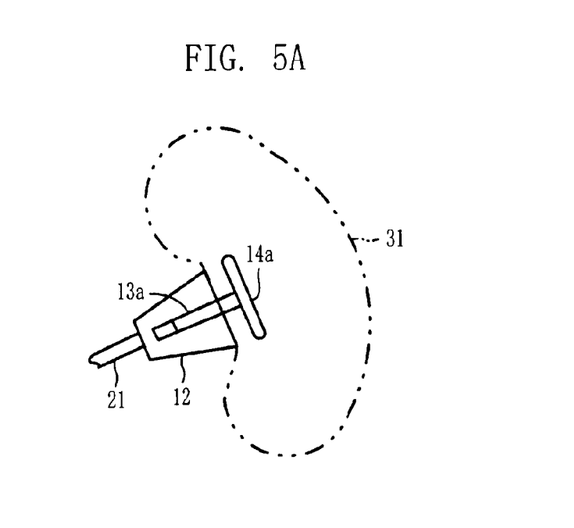
FIGS. 5A to 5C are an explanation view for explaining a deployment state of the airbag.

Subsequently, the gas generating agents 34a and 34b disposed in each chamber of the container 33 are ignited simultaneously, and the generated gas is supplied to the airbag 31. When gas is supplied into the airbag 31, the airbag 31 is inflated while an inflation pressure of the airbag increases as time elapses, as illustrated with a solid line in FIG. 4. At this instance as illustrated in FIG. 5A, because the grips 14a and 14b are positioned within 45° from the neutral position of the steering apparatus, the grips 14a and 14b are not positioned to support the mid-upper and lower portions of the rear of the airbag 31, the middle upper and lower portion of the airbag 31 is not prevented being displaced in the forward direction of the vehicle. However, because some gas is supplied to the airbag 31, the inflation pressure of the airbag 31 quickly increases and the airbag is inflated using the increased inflation pressure. As the results, the mid-upper and lower portions of the front of the airbag are prevented from being displaced in the forward direction of the vehicle.

Figure 5B:
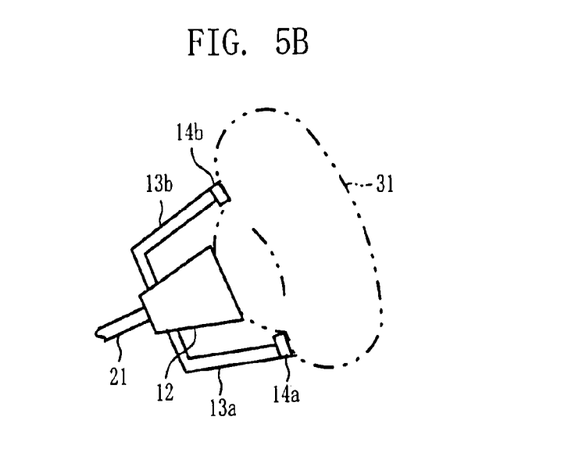
Figure 5C:
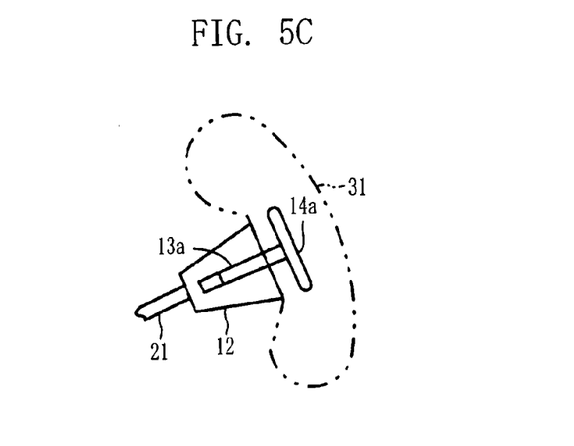

In addition, if, when the vehicle collides with the front object, the absolute value of the steering angle |θ| is not less than 45°, the electronic control unit 43 determines "No" at S12, and thus activates either one of the first inflator IF1 and the second inflator IF2 at S14. That is, either one of the squibs 35a and 35b is energized. And thus, either one of the gas generating agents 34a and 34b in the both chambers of the container 33 is ignited. Therefore, a small amount of gas is supplied into the airbag 31, as compared to the amount of the gas when inflators are activated. Because the airbag 31 is inflated by the small amount of gas, the inflation pressure of the airbag 31 is lower than that when both inflators are activated. The inflation pressure of the airbag increases as time elapses as illustrated with a broken line in FIG. 4. As illustrated in FIG. 5B, the grips 14a and 14b are positioned within 45° in the right-hand side or the left-hand side from the neutral position (horizontal position) and support the mid-upper and lower rear portions of the airbag 31, to prevent the mid-upper and lower portion of the airbag 31 from being displaced in the forward direction of the vehicle. Therefore, although a small amount of gas is supplied into the airbag 31 and thus the inflation pressure of the airbag is lower than that when both inflators are activated, the airbag 31 can be restricted at the mid-upper and lower portion of its front side from being displaced in the forward direction of the vehicle just as when both inflators are activated.

As it is understood from the description of the above operation, in accordance with the present embodiment, when the steering apparatus 10 is rotated to the right or to the left from its neutral position, such that the grips 14a and 14b come into position above or below the steering apparatus, the grips 14a and 14b accurately prevent the mid-upper and lower portions the airbag 31 from being displaced in the forward direction of the vehicle (see FIG. 5B). In addition, when the steering apparatus 10 is at or close to its neutral position, the grips 14a and 14b are not in a position to prevent the mid-upper and lower portions of the airbag 31 from being displaced in the forward direction of the vehicle. However, the mid-upper and lower sides of the airbag 31 are prevented from being displaced toward the front of the vehicle due to the increased inflation pressure of the airbag. That is, if the steering apparatus 10 is positioned at or close to the neutral position, the airbag 31 is inflated using a higher inflation pressure (see FIG. 5A). In this case, because both the first inflator IF1 and second inflators IF2 are activated simultaneously, the airbag inflates using a inflation pressure which is higher than that used when the inflators IF1, IF2 are activated sequentially. Therefore, regardless of the orientation of the steering apparatus 10, because mid-upper and lower portions of the airbag 31 are always and accurately prevented from being displaced in the forward direction of the vehicle, the displacement of the driver's head in the forward direction of the vehicle is accurately restrained by a reaction force of the airbag 31. As a result, the driver is well protected.

Next, a vehicle steering apparatus in accordance with a second embodiment of the present invention will be described in detail. The vehicle steering apparatus in accordance with the present embodiment is a steer-by-wire type vehicle steering apparatus. In the vehicle steering apparatus, a steering operation unit is mechanically disconnected from a steering unit, wherein the steering operation unit is operated to be steered by the driver, and the steering unit steers the left and right front wheels. That is, a steering shaft 21 is mechanically disconnected from a steering mechanism (not shown in drawings) for the left and right front wheels.

Figure 6:
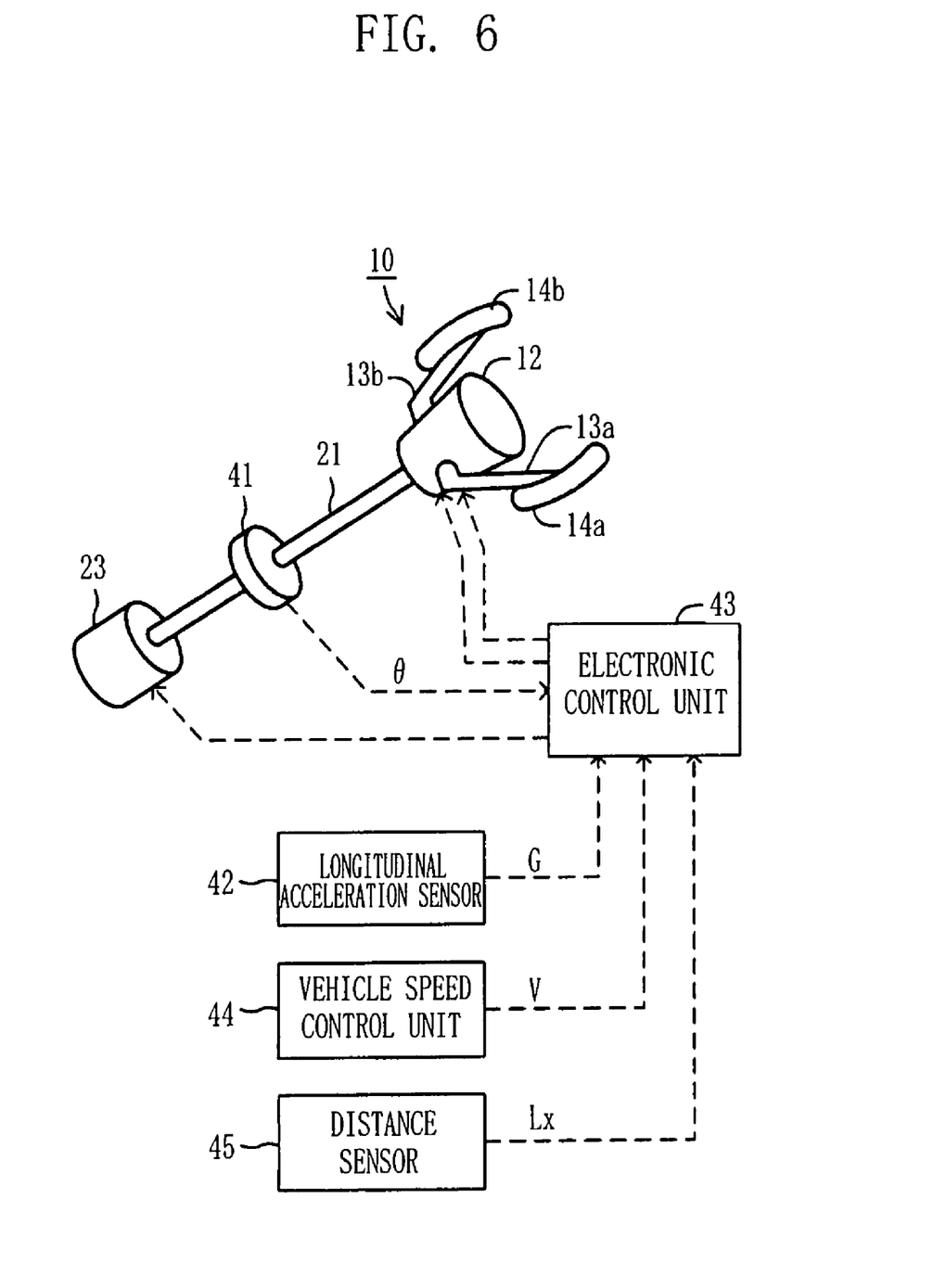
FIG. 6 is a perspective plan view the schematically illustrates a vehicle steering apparatus including an airbag in accordance with a second embodiment of the present.

As illustrated in FIG. 6, the steering operation unit includes a steering reaction motor 23, which is installed at the steering shaft 21. The steering reaction motor 23 is essentially used to apply a reaction force in response to the rotation of the steering apparatus 10 (grips 14a and 14b). That is, when the vehicle is moving, the right and left front wheels are steered by a steering motor, which will be described later. When the right and left front wheels are steered, the reaction force that is applied to the steering apparatus 10 is applied by controlling the rotation drive force of the steering reaction motor 23, depending on the steering angle θ detected by the steering angle sensor 41. However, in the present embodiment, the steering reaction motor 23 is used as an actuator for rotating the steering apparatus 10 in the event of a vehicular collision. The configuration of the steering operation unit, except the steering reaction motor 23, is the same as those of the first embodiment.

The steering unit includes the steering motor, which is used to steer the right and left front wheels. The steering unit controls the rotation of the steering motor by a rotation angle corresponding to steering angle θ detected by the steering angle sensor 41, to thereby steer the right and left front wheels. Because steer-by-wire vehicle steering apparatuses are well-known and do not directly relate to the present invention, the description of a steer-by-wire vehicle steering apparatus is omitted here.

In the vehicle steering apparatus in accordance with the second embodiment, an electronic control apparatus includes a vehicle speed sensor 42 and a distance sensor in addition to the steering angle sensor 41, the vehicle longitudinal acceleration sensor 42, and the electronic control unit 43, all of which are same as those in the first embodiment. The vehicle sensor 44 detects a vehicle speed V. The distance sensor 45 is configured to a radar device, which is mounted on the front end of the vehicle and may utilize a millimeter wave, an infrared ray, etc. The distance sensor 45 detects a distance Lx from the front end of the vehicle to the front object (generally a vehicle in front of the host vehicle). Also, the electronic control unit 43 performs repeatedly a collision prediction program in FIG. 7 at predetermined intervals in parallel with the airbag deployment control program in FIG. 3 in accordance with the first embodiment.

Figure 7:
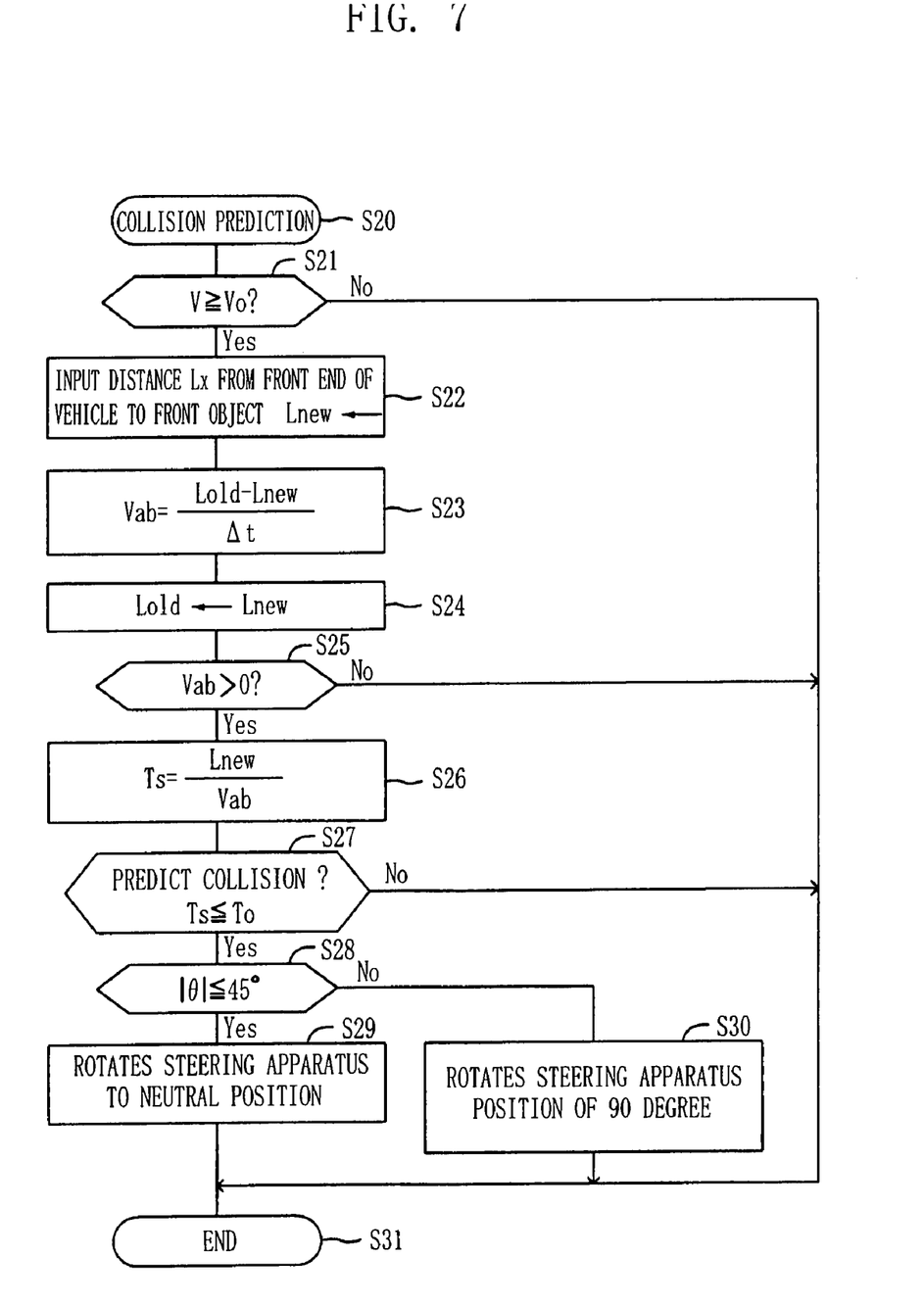
FIG. 7 is a flow chart illustrating a collision prediction program that is executed by an electronic control unit shown in FIG. 6.

The collision prediction program is started at S20, and the electronic control unit 43 inputs the vehicle speed V detected by the vehicle speed sensor 47 at S21. Then, the electronic control unit 43 determines whether the vehicle is moving by determining whether the vehicle speed V is at or above a predetermined vehicle speed Vo (e.g., 5 km/h). If the vehicle is nearly stopped, that is, the vehicle speed is below the predetermined vehicle speed Vo, the electronic control unit determines "No" at S21, and then an execution of the airbag deployment control program is terminated at S31.

In addition, if the vehicle starts moving and thus the electronic control unit 43 determines "Yes" at S21 (that is, when the vehicle speed V is at or above the predetermined vehicle speed Vo), the electronic control unit 43 performs the processes that follow S22. At S22, the electronic control unit 43 inputs the distance Lx from the front end of the vehicle to the front object, which is detected by the distance sensor 45. The distance that is input during this process is represented and set to a new distance $L_{new}$. Next, at S23, the electronic control unit 43 calculates a relative velocity $V_{ab}$ (=$(L_{old}-L_{new})/\Delta t$) with respect to the front object. The calculation of the relative velocity is obtained in such a manner that the difference ($L_{old}-L_{new}$) is divided by an execution time interval $\Delta t$ of the collision prediction program. The distance $L_{old}$ is input in the former process (hereinafter, an old distance referred to as $L_{old}$). At this time, the old distance $L_{old}$ is set to "0" by an initial setting process (not shown in drawings). If the relative velocity is initially calculated as a negative value, and thus the electronic control unit 43 determines "No" at S25 as described later, the execution of the collision prediction program is terminated at S31. Although the initially calculated relative velocity $V_{ab}$ may be inadequate, it does not make a problem.

After the relative velocity $V_{ab}$ is calculated, the old distance $L_{old}$ is updated to the new distance $L_{new}$ in order to calculate a new relative velocity $V_{ab}$ at S24. The electronic control unit 43 then determines whether the relative velocity $V_{ab}$ is a positive value at S25. If the relative velocity $V_{ab}$ is a negative value as described above, the electronic control unit 43 determines "No" at S25 and then the execution of the collision prediction program is terminated at S31. It means that when the relative velocity $V_{ab}$ is not a positive value, the distance Lx from the front end of the vehicle to the front object does not vary or increases, and thus the vehicle will not collide with the front object.

In contrast, if the relative velocity $V_{ab}$ is positive, the electronic control unit 43 determines "Yes" at S25, and then the process proceeds to S26. At S26, by dividing the new distance $L_{new}$ by the relative velocity $V_{ab}$, when the vehicle is continuously running with a present relative velocity $V_{ab}$, the electronic control unit 43 calculates a collision time Ts(=$L_{new}/V_{ab}$) which is a time until the front end of the vehicle collides with the front object. The electronic control unit 43 determines whether the collision time Ts is less than or equal to a predetermined time To at S27. The predetermined time To is set short (e.g. about 3 second) in which the vehicle collision with the front object is unavoidable even though the driver may step on a brake pedal and operates steering apparatus to avoid colliding with the front object (e.g., rotates the steering apparatus 10).

If the collision time Ts exceeds the predetermined time To, and thus the electronic control unit 43 determines "No" at S27, the execution of the airbag deployment control program is terminated at S31. However, if the collision time Ts is less than or equal to the predetermined time To, the electronic control unit 43 determines "Yes" at S27. Then, as in S12 in FIG. 3, at S28, the electronic control unit 43 inputs the steering angle θ from the steering angle sensor 41, and determines whether the absolute value of the steering angle |θ| is less than or equal to a reference steering angle (i.e., 45°). If the absolute value of the steering angle |θ| is less than or equal to 45°, the electronic control unit 43 determines "Yes" at S28, and thus the electronic control unit 43 controls the rotation of the steering reaction motor 23, to rotate the steering apparatus 10 to the neutral position. More specifically, if the steering angle θ is within a range from 0° to −45°, the steering apparatus 10 is rotated toward the right by as much as |θ|. If the steering angle θ is 0°, the steering apparatus 10 is maintained as it is. If the steering angle θ is greater than 0° and less than or equal to 45°, the electronic control unit 43 rotates the steering apparatus 10 toward the left by as much as |θ|. Therefore, in the second embodiment, the steering apparatus 10 is rotated within a range of 135° toward the right or the left from the neutral position.

In such state, if the vehicle collision is detected (i.e., when the electronic control unit 43 determines "Yes" at S11), the electronic control unit 43 determines "Yes" at S12 while operating the first and the second inflators IF1 and IF2 simultaneously, as in the case of the first embodiment. Therefore, the gas generating agents 34a and 34b disposed in both chambers of the container 33 are ignited simultaneously, and the generated gas is supplied into the airbag 31. As the gas is supplied into the airbag 31, the inflation pressure of the airbag 31 quickly increases and the airbag is inflated using the increased inflation pressure. As a result, although the rear of the airbag 31 at its mid-upper and lower portion is not supported by the grips 14a and 14b, the mid-upper and lower portion of the front of the airbag 31 is appropriately prevented from being displaced toward the front of the vehicle (see FIG. 5A).

If the absolute value of the steering angle |θ| is exceeds 45° and thus the electronic control unit 43 determines "No" at S28, the electronic control unit 43 controls the rotation of the steering reaction motor 23 at S30 and then rotates the steering apparatus 10 to a position of 90° from its neutral position. More specifically, if the steering angle θ is between about −45° and −90°, or about 45° and 90°, the electronic control unit 43 rotates the steering apparatus 10 to either the left or the right, as appropriate, by (90-|θ|)°. In addition, if the steering angle θ is −90° or 90°, the steering apparatus 10 is maintained as it is. When the steering angle θ is between about −90° and −135°, or about 90° and 135°, the electronic control unit 43 rotates the steering apparatus 10 to either the left or the right, as appropriate, by (|θ|-90)°.

In such the state, if a vehicle collision is detected (i.e., when the electronic control unit 43 determines "Yes" at S11 in FIG. 3), the electronic control unit 43 determines "Yes" at S12 while operating either one of the first inflator IF1 and the second inflator IF2 as in the first embodiment. Therefore, either one of the gas generating agents 34a and 34b respectively disposed in both chambers of the container 33 may be ignited, and thus a smaller amount of gas is supplied into the airbag 31 in comparison to when both inflators are activated. Therefore, the inflation pressure of the airbag is lower than when both inflators are activated. However, in this instance, because the rear mid-upper and lower portions of the airbag are supported by the grips 14a and 14b, the grips 14a and 14b accurately prevent the front mid-upper and lower portions of the airbag 31 from being displaced in the forward direction of the vehicle (see FIG. 5B).

As understood from the description of the operation above in accordance with the second embodiment, because the mid-upper and lower portions of the airbag 31 are always and accurately prevented from being displaced in the forward direction of the vehicle regardless of the orientation of the steering apparatus 10, the reaction force exerted by the airbag properly restrains the driver's head, and the driver's head is thereby prevented from being displaced in the forward direction of the vehicle. As a result, the driver is well protected. Also in the second embodiment, if the vehicle collides with the front object and thus the airbag 31 is deployed, the steering apparatus 10 is rotated to a position closer to either the neutral position or to the 90° position if the rotation position of the steering apparatus 10 in either its neutral position or at the rotated position of 90° from the neutral position. The inflation pressure of the airbag is switched in two stages of high-low level by adjusting the inflation pressure of the airbag 31 by activating the first and second inflators IF1 and IF2 either simultaneously or sequentially. In this way, although the inflation pressure of the airbag is just switched in two stages of high-low level, the displacement of the driver's head in the forward direction of the vehicle is more appropriately restrained by the reaction force of the airbag 31 because the middle upper and lower portion of the airbag 31 is always prevented from being displaced in the forward direction of the vehicle. As a result, the driver is well protected.

While the present invention has been described with respect to specific embodiments, it will be apparent to those skilled in the art that various changes and modifications may be made without departing from the spirit and scope of the invention.

In the second embodiment described above, when a vehicle collision is predicted (i.e., before the vehicle collision is detected), the electronic control unit 43 executes an operation to rotate the steering apparatus 10 to its neutral position or to a position 90° from the neutral position. Also, when the vehicle collision is detected (i.e., when the operation control of the first and second inflators IF1 and IF2 starts), the above described operation control may be executed. In this instance, it is preferable that the processes in S29 and S30 are performed respectively, just before or just after the S13 and S14 in FIG. 3. However, even if such processes are performed, it takes some time to deploy the airbag. Further, an advantageous effect similar to that in the second embodiment can be achieved because the steering apparatus 10 is rotated to either its neutral position or 90° from its neutral position just before the deployment of the airbag is terminated.

In addition, in the first and second embodiments, the first and second inflators IF1 and IF2 are simultaneously activated. Alternatively, the first inflator IF1 and second inflator IF2 may be individually activated. Furthermore, the reference steering angle for the rotation control position remains at 45° as long as the actual steering angle is between neutral position and the rotated position of 90° from its neutral position. Therefore, it is preferable that the reference steering angle is closer to 45°. However, the reference steering angle may be about 60° in some instance. In this regard, the reference steering angle is an angle between 0° and 90°.

In the first and second embodiments, the inflation pressure of the airbag is switched by activating the first and second inflators IF1 and IF2 either simultaneously or sequentially. In place such case, the inflation pressure of the airbag may be switched by controlling the activation timing of the first and second inflators IF1 and IF2. More specifically, if the first and second inflators IF1 and IF2 are activated sequentially, the inflation pressure of the airbag becomes lower, as compared with the inflation pressure of the airbag when the first and second inflator IF1 and IF2 are simultaneously activated. That is, if the absolute value of the steering angle |θ| is less than or equal to 45°, the first and second inflator IF1 and IF2 are simultaneously activated. However, if the absolute value of the steering angle |θ| is greater than 45°, the first and second inflator IF1 and IF2 are sequentially activated.

Further, in the first and second embodiment, the inflation pressure of the airbag during the airbag deployment is switched by activating the first and second inflators IF1 and IF2 either simultaneously or sequentially. However, the inflation pressure of the airbag may also be switched using a simple inflator instead. In this instance, the container 33 has a simple chamber without a partition wall installed at the container 33. The gas-generating agent is accommodated in the container 33 while a simple squib is disposed at the container 33. Further, the discharge amount of the gas is switched by adjusting an opening area of an outlet of the container 33 in accordance with the magnitude of the steering angle θ. The outlet of the container 33 is communicated with an inside of the airbag. More specifically, if the absolute value of the steering angle |θ| is less than or equal to 45°, the opening area of the outlet is increased. If the absolute value of the steering angle |θ| is greater than 45°, the opening area of the outlet is reduced.

Figure 8A:
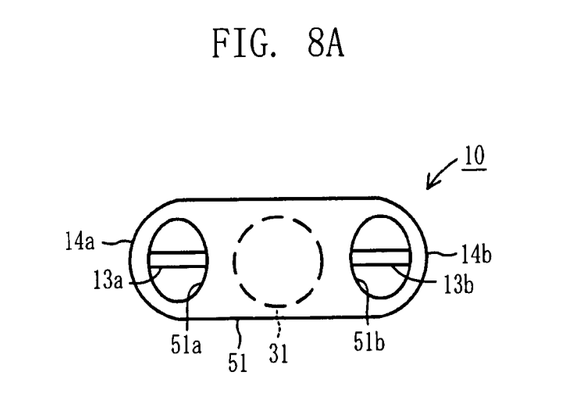
FIGS. 8A to 8C are plan views illustrating various modifications of a steering apparatus.
Figure 8B:
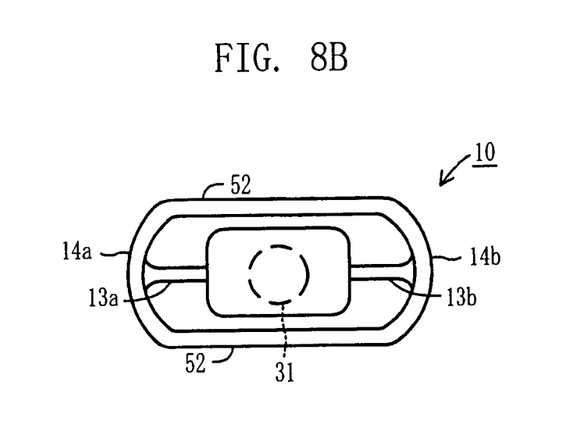

In addition, it is possible to modify the shape of the steering apparatus 10 into various shapes. For example, as illustrated in FIG. 8A, it is possible to provide an elliptically shaped pad cover between the grips 14a and 14b. The pad cover 41 is made of resin and has oval holes 51a and 51b on its right and left sides for receiving hands of the driver. Further, as illustrated in FIG. 8B, it is possible to provide a pair of rods 52 and 52 to integrally connect the both ends of grips 14a and 14b. Even in the modified embodiment illustrated in FIG. 8A and FIG. 8B, the dashboard remains clearly visible to the driver.

Figure 8C:
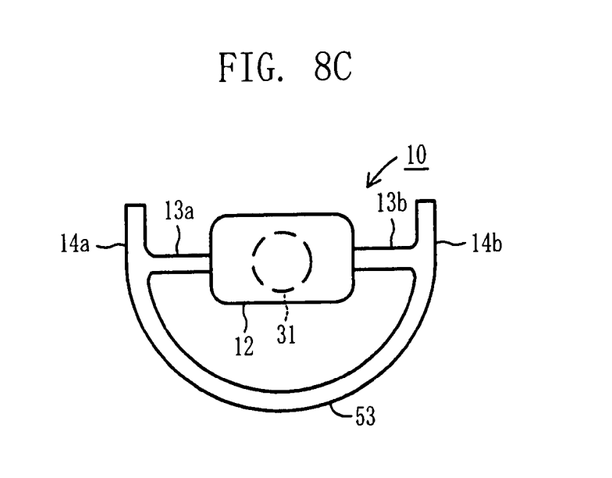

Furthermore, as illustrated in FIG. 8C, it is possible to provide a semicircular grip 53 to integrally connect the lower ends of the grips 14a and 14b. In this instance, when the steering apparatus in the neutral position, the grip 53 is not positioned on the upper side of the steering apparatus, but is positioned on the lower side thereof. Therefore, while the airbag is being deployed, the lower rear portion of the airbag is supported by the grip 53, but the upper rear portion of the airbag is not supported. And thus, the displacement of the upper portion of the airbag toward the front of the vehicle tends to be large. Even in this instance, however, when the steering apparatus 10 is positioned at or near its neutral position and when the inflation pressure of the airbag is increased in accordance with the first and second embodiments, the displacement of the upper portion of the airbag is restricted. Therefore, an advantageous effect similar to that in the first and second embodiments can be achieved. In addition, the dashboard will still be clearly visible to the driver because a grip is not positioned on the upper portion of the steering apparatus.

While the invention has been shown and described with respect to the example embodiments, it will be understood by those skilled in the art that various changes and modifications may be made without departing from the spirit and scope of the invention as defined in the following claims.

What is claimed is:

1. A vehicle airbag device employed in a steering apparatus, wherein the steering apparatus is configured with grips positioned on at least the right and left sides of the steering apparatus, but not on the upper side of the steering apparatus, and which is rotated for steering the vehicle, the vehicle airbag device comprising:

an airbag, provided in a center portion of the steering apparatus that is configured to deploy toward the driver;

a steering angle sensor that detects a steering angle of the steering apparatus;

a deployment controller that controls a deployment of the airbag in a case of a vehicle collision, wherein the deployment controller increases an inflation pressure of the airbag when the detected steering angle is less than or equal to a predetermined reference angle, compared to when the detected steering angle exceeds the predetermined reference angle;

an actuator that rotates the steering apparatus; and a rotation controller that controls the actuator, wherein, when a vehicle collision occurs or when the vehicle collision is predicted, the rotation controller controls the actuator so that the steering apparatus is rotated to the neutral position when the detected steering angle is less than or equal to the predetermined reference angle, and so that the steering apparatus is rotated to a position that is 90° from the neutral position when the detected steering angle exceeds the predetermined reference angle.

2. The steering apparatus of claim 1, wherein the reference angle is equal to or less than 90° to the right or left of the neutral position.

3. The steering apparatus of claim 2, wherein the reference angle is a value of 45° or 60° to the right or left of the neutral position.

4. A control method for a vehicle airbag device employed in a steering apparatus, wherein the steering apparatus is configured with grips positioned on at least the right and left sides of the steering apparatus, but not on the upper side of the steering apparatus, and the steering apparatus is configured to rotate for steering the vehicle, the control method comprising:

detecting a steering angle of the steering apparatus;

increasing an inflation pressure of the airbag if the detected steering angle is less than or equal to a predetermined reference angle, as compared with a case where the detected steering angle exceeds the predetermined reference angle when a vehicle collision occurs or when the vehicle collision is predicted; and rotating the steering apparatus to the neutral position when the detected steering angle is less than or equal to the predetermined reference angle, or rotating the steering apparatus to a position of 90° from the neutral position when the detected steering angle exceeds the predetermined reference angle.

5. The control method for a steering apparatus of claim 4, wherein the rotating step performs rotating of the steering apparatus just before or just after the airbag is deployed.

6. The control method for a steering apparatus of claim 4, wherein the inflation pressure of the airbag is switched by controlling an activation timing of two inflators.

7. The control method for a steering apparatus of claim 6, wherein the two inflators are simultaneously activated when the detected steering angle is less than or equal to the reference angle, and the two inflators are sequentially activated when the detected steering angle exceeds the reference angle.

8. The control method for a steering apparatus of claim 4, wherein the inflation pressure of the airbag is performed using a simple inflator; wherein a discharge amount of gas supplied to the airbag is switched by adjusting an opening area of an outlet of a container in accordance with a dimensions of the steering angle; and wherein the outlet of the container is communicated with an inside of the airbag.

9. The control method for a steering apparatus of claim 4, wherein the reference angle is a value within a range smaller than 90° to the right or left of the neutral position.

10. The control method for a steering apparatus of claim 9, wherein the reference angle is between about 45° to about 60° to the right or left of the neutral position.

* * * * *